No. 686,837.  
Patented Nov. 19, 1901.

M. A. SMITH.
FRUIT DRYING APPARATUS.
(Application filed Nov. 23, 1900.)

(No Model.)

WITNESSES.  
INVENTOR.  
Mahlon A. Smith.  
Attorneys.

UNITED STATES PATENT OFFICE.

MAHLON A. SMITH, OF LEAMINGTON, CANADA, ASSIGNOR OF TWO-THIRDS TO SAFFORD GRANT MORSE, OF LEAMINGTON, CANADA.

FRUIT-DRYING APPARATUS.

SPECIFICATION forming part of Letters Patent No. 686,837, dated November 19, 1901.

Application filed November 23, 1900. Serial No. 37,428. (No model.)

*To all whom it may concern:*

Be it known that I, MAHLON A. SMITH, a citizen of Canada, residing at Leamington, in the county of Essex, Province of Ontario, Canada, have invented certain new and useful Improvements in Fruit-Drying Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to apparatus for drying fruit and other substances; and it consists in the construction and arrangement of parts hereinafter fully set forth, and pointed out particularly in the claims.

The object of the invention is to provide apparatus of the character described in which the arrangement is such as to effect a perfect and uniform drying of the fruit, to turn the fruit automatically upon the conveyer as it passes through the drying-room, to effect economy in the labor of handling the fruit, and shorten the time necessary in which to effect a perfect drying thereof.

The above object is attained by the apparatus illustrated in the accompanying drawings, in which—

Figure 1:
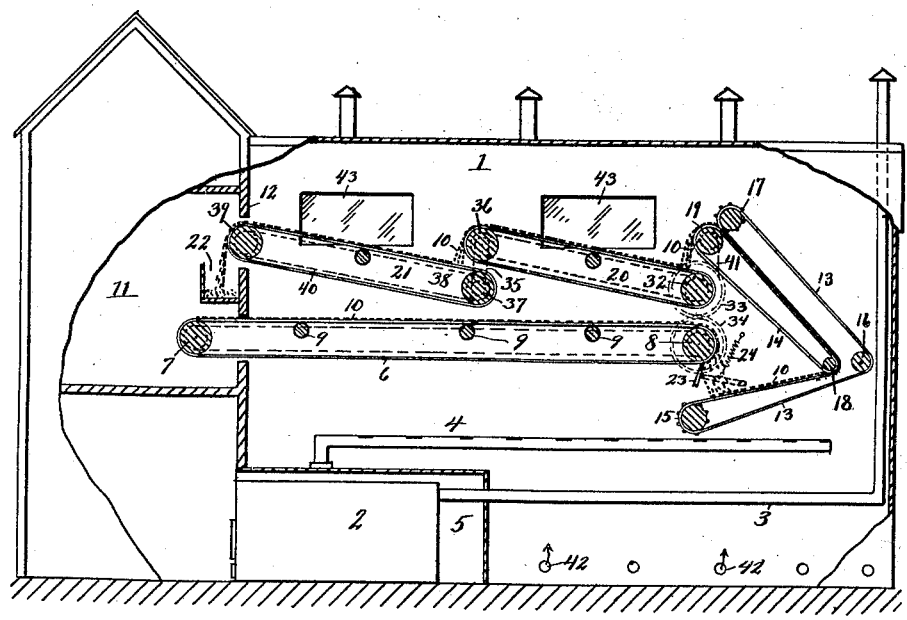
Figure 2:
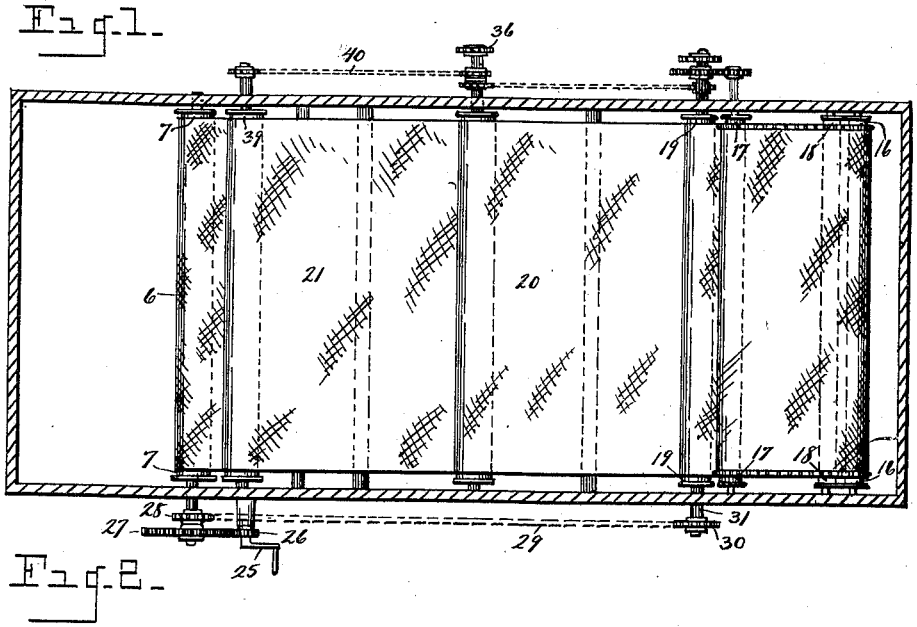

Figure 1 is a view, partly in longitudinal section, showing a drying-room in which my improved apparatus is mounted. Fig. 2 is a horizontal section through the drying-room, showing a plan view of the mechanism therein and the driving-gearing through which the mechanism is propelled.

Referring to the characters of reference, 1 designates a drying-room in which the conveyers upon which the fruit is deposited for drying are located and below which is a suitable hot-air furnace 2, having a smoke-pipe 3 leading therefrom and one or more hot-air pipes 4, with apertures in the upper face thereof, leading from the hot-air space 5 of said furnace and extending longitudinally of the drying-chamber.

6 designates the main conveyer, which is of the endless pattern and is formed of wire screen or other suitable fabric. Said conveyer 6 is mounted upon rollers 7 and 8, located at the opposite ends thereof and suitably journaled in the frame of the building, being supported intermediate the rollers by a series of smaller rollers 9. The conveyer 6 is of such width as to extend from side to side of the drying-chamber and is adapted to receive the cut fruit, which is placed upon the forward end thereof, supported by the roller 7, and which is indicated by dotted lines 10. The forward end of the conveyer extends into a suitable building 11 adjacent the drying-chamber, but separated therefrom by partition 12, and in which the work of preparing the fruit for drying is carried on and into which the fruit after being dried is discharged.

The upper side of the conveyer 6 by means hereinafter described is given a slow rearward movement, so that the fruit deposited therein as it travels rearwardly is subjected to the action of the heat arising from the hot-air pipe 4. At the rear end of the conveyer 6 are located the supplemental conveyers 13 and 14, respectively. The conveyer 13 describes a triangle and is supported by the rollers 15, 16, and 17, which have sprocket-teeth that engage the chain margins of said conveyer. The lower portion of the conveyer 13 extends forward under the rear end of the main conveyer 6, so that the particles of fruit falling from the rear end of the main conveyer will drop onto the upper side of said conveyer 13. The fruit as it drops onto the conveyer 13 is carried rearwardly thereby and passes under the roller 18, around which conveyer 13 passes and which also holds and supports the lower end of the conveyer 14, the upper end of the conveyer 14 being supported by the roller 19, whereby the opposed faces of the conveyers 13 and 14 are brought adjacent or contiguous, so that the fruit upon conveyer 13 after passing under the roller 18 is confined between the opposed faces of the conveyers 13 and 14 and elevated thereby, so as to be discharged over the roller 19 onto the upper face of the first section 20 of the sectional conveyer, located above the main conveyer 6. To cause the adjacent faces of the conveyers 13 and 14 to travel together, the rollers 17 and 19 are made to turn in opposite directions, as will be well understood.

There may be as many sections as desired in the upper conveyer, the upper face in each section of which is carried forward, so that the fruit thereon may be discharged from one section to another, the finally-dried fruit being discharged from the last section 21 into any suitable receptacle 22, located in the building 11 adjacent to the drying-room.

Like the main conveyer 6, all of the conveyers extend from side to side of the drying-room and are formed of wire-netting or analogous material, so as to afford a free circulation of hot air therethrough, enabling said air to come in contact with all sides of the cut fruit.

It will be observed that as the fruit is discharged from the conveyer 6 and falls upon the conveyer 13 it is overturned, thereby presenting a new surface to the action of the strong upward current of heat, and that said fruit is turned in succession when carried upward in the elevator and when discharged onto the upper-conveyer section 20 and onto the section 21. This turning of the fruit makes it possible to effect a perfect and uniform drying thereof, obviating the possible burning of the fruit on one side and saving the expense of an attendant or operator, who, where the old form of a straight conveyer is used, must enter the drying-chamber and turn by hand the fruit upon the conveyer. It will also be observed that by the use of the elevator and the upper sectional conveyer in returning the dried fruit the length of the drying-chamber may be reduced nearly one-half, thereby effecting economy in the construction of the building and at the same time economizing in the use of heat, for the reason that the heat which acts upon the fruit upon the lower conveyer passes upward and also acts upon the fruit upon the upper conveyer.

To prevent the fruit or substance being dried from sticking to the conveyer 6 and following along the under side thereof, a scraper 23 is employed, which engages the under face of said conveyer at the roller 8 and scrapes the fruit therefrom, said scraper being held in contact by means of the spring 24.

The main conveyer 6 is driven through the medium of a crank 25, having on its shaft a pinion 26, which meshes with a gear 27 on the shaft of the roller 7, whereby a rotation of the crank will cause the roller 7 to revolve. Upon the shaft of the roller 7 is a sprocket-wheel 28, which is connected by a chain 29 with the sprocket-wheel 30 on the shaft 31 of the roller 8, whereby rollers 7 and 8 are caused to rotate in unison. The rear roller 32 of the upper-conveyer section 20 is connected with roller 8 by means of a gear-wheel 33 on the shaft thereof, which meshes with a like gear-wheel 34 on the shaft of the roller 8, (shown by dotted lines in Fig. 1,) whereby movement is imparted to the section 20 of the upper conveyer, which in turn imparts movement to section 21 by means of a sprocket-chain 35, extending from a sprocket-wheel 36 on the shaft of the upper roller thereof to a like wheel 37 on the shaft of the rear roller 38 of the section 21, the forward roller 39 being connected to the rear roller of section 21 by means of a sprocket-chain 40. Conveyers 13 and 14 are driven by a geared connection of their respective rollers 17 and 19, driven by a chain 41, leading from a sprocket-wheel on the shaft of the roller 32.

The operator may readily determine the proper speed at which to drive the conveyers in order to subject the fruit to the action of the heat a sufficient length of time to effect a proper drying thereof by examining the dried fruit as it is discharged into the receptacle 22. Should the fruit show excessive drying, the movement of the conveyers may be accelerated. Should the fruit be insufficiently dried, the movement of the conveyers may decreased.

At the base of the drying-chamber are located suitable ventilating-openings 42 for the purpose of admitting air in requisite quantities to said chamber, and in the wall of the chamber are windows 43 for affording light to the interior to permit of the inspection of the drying fruit.

Having thus fully set forth my invention, what I claim as new, and desire to secure by Letters Patent, is—

1. In a drying apparatus, the combination of the drying-chamber, means for supplying hot air to said chamber, the main conveyer located in said drying-chamber, the return-conveyer located above the main conveyer, the elevating-conveyers at the rear of the upper and lower conveyers consisting of two single conveyers, a portion of whose faces run contiguously, one of said elevating-conveyers passing around rollers arranged in a triangle to cause its ends to embrace the ends of the upper and lower conveyers and means for imparting movement to said conveyers.

2. In a drying apparatus, the combination of a drying-chamber, a lower conveyer located therein, extending horizontally, an upper conveyer located above the lower conveyer consisting of a plurality of independent sections having overlapping ends, an elevating-conveyer for carrying the substance from the lower conveyer to the upper conveyer, said elevating-conveyer consisting of a double conveyer formed of the single conveyers, whose inner faces travel contiguously, one of said single conveyers extending under the rear end of said lower conveyer to receive the substance therefrom.

In testimony whereof I sign this specification in the presence of two witnesses.

MAHLON A. SMITH.

Witnesses:
CHAS. G. NOBLE,
Mrs. HENRY WIPER.